United States Patent [19]

Nimerick

[11] 4,330,339

[45] May 18, 1982

[54] LOWER ALKANOIC ACID DERIVATIVES OF A DIETHANOLAMINE/FATTY ACID CONDENSATE

[75] Inventor: Kenneth H. Nimerick, Tulsa, Okla.

[73] Assignee: The Dow Chemical Company, Midland, Mich.

[21] Appl. No.: 109,723

[22] Filed: Jan. 4, 1980

[51] Int. Cl.[3] .............................................. C08L 91/00

[52] U.S. Cl. .................................... 106/243; 260/404; 252/61

[58] Field of Search ........................ 106/243; 209/166; 260/404; 252/357, 61

[56] References Cited

U.S. PATENT DOCUMENTS

| | | | |
|---|---|---|---|
| 2,173,058 | 5/1939 | Kritchevsky | 260/404 |
| 2,205,042 | 6/1940 | Lenher et al. | 28/1 |

*Primary Examiner*—Allan Lieberman
*Assistant Examiner*—Patricia Short
*Attorney, Agent, or Firm*—D. H. Fifield

[57] ABSTRACT

The title compositions exhibit superior efficacy as conditioners in the flotation of coal. These compositions are prepared by condensing diethanolamine with a $C_{10}$–$C_{24}$ fatty acid in a molar ratio of 1:2 and then introducing one-half the equimolar amount, relative to the condensate, of $C_1$–$C_4$ alkanoic acid.

8 Claims, No Drawings

LOWER ALKANOIC ACID DERIVATIVES OF A DIETHANOLAMINE/FATTY ACID CONDENSATE

BACKGROUND OF THE INVENTION

The condensation products of alkanolamines and higher organic acids are known. British Pat. No. 306,116 discloses that wetting or cleansing agents can be prepared by condensing amines bearing at least two hydroxyalkyl groups with higher organic carboxylic acids. British Pat. No. 337,737 teaches that condensates of monoalkanolamines and fatty acids or salts thereof are useful as wetting agents. U.S. Pat. No. 2,173,909 discloses that fatty alkanolamides can be employed in ore flotation, particularly in a slightly acidic medium. U.S. Pat. No. 2,609,931 teaches that mono fatty amide derivatives of N,N-dihydroxyalkylethylenediamine are useful filtering agents; the acetate salts of these compounds is alleged in column 6, lines 43–47 to be particularly useful in some applications. U.S. Pat. No. 2,993,919 describes the use of acid salts of mixtures of fatty alkanolamides and diethanolamine in ore flotation.

SUMMARY OF THE INVENTION

A novel composition of matter has now been discovered comprising the reaction product of two components:

(1) a condensation product of diethanolamine and a $C_{10}$–$C_{24}$ fatty acid condensed in a mole ratio of about 1:2; and (2) about one-half equimolar amount of a $C_1$–$C_4$ monocarboxylic acid or mixtures thereof, based on the moles condensate.

DETAILED DESCRIPTION OF THE INVENTION

The condensation products of diethanolamine and fatty acids are known in the art, but generally an excess of at least an equimolar amount of diethanolamine relative to fatty acid is employed in preparing these condensates. The term "condensation product" is employed herein to distinguish this product from the ammonium salt of the fatty acid produced at lower reaction temperatures. The condensation product in the subject novel composition is prepared using a ratio of from about 1.8 to 2.2 moles of fatty acid for each mole of diethanolamine.

The fatty acid condensed with diethanolamine can operably be a fatty acid having a saturated or unsaturated alkyl group. The fatty acid can suitably bear hydroxyl substituents on its alkyl portion, but such substitution does not impart any substantial advantage. Fatty acids such as oleic, lauric, linoleic, palmitic, stearic, myristic, mixtures thereof and other like fatty acids are operable. The esters corresponding to the fatty acids, such as glycerides, are also operable, as they produce the same condensate, but are less preferred. For reasons of economy, it is preferred to use crude mixtures of fatty acids with minor amounts of rosin acids, lignin and unsaponifiable material, such as tall oil, coconut oil, palm oil, palm kernal oil, cottonseed oil, linseed oil, olive oil, peanut oil, fish oil and the like. Tall oil and tall oil heads are especially preferred mixtures of fatty acids. Tall oil and tall oil heads are well-known compositions described in the *Kirk-Othmer, Encyclopedia of Chemical Technology,* 2nd Ed., Vol. 19, pp. 614–629 (1969), which is incorporated herein by reference.

Of course, the preferred crude mixtures of fatty acids cannot literally be said to have a single molecular weight. For the purposes of this description one mole of such a crude fatty acid contains fractional moles of constituent fatty acids totaling one mole.

The fatty acid or corresponding ester and the diethanolamine can be readily reacted by bringing these reactants together and heating until substantially complete condensation has taken place as indicated by the water distilled overhead or infrared spectrophotometric analysis of the condensation product. Generally, a reaction temperature of from about 120° C. to about 250° C. is operable. The condensation product contains predominantly an amide ester with a remaining amount of principally amide, and amide diester derivatives.

The subject composition is prepared by adding the water-soluble lower alkanoic acids: formic, acetic, propionic or butyric acids or a mixture thereof to the above-described condensation product at a temperature which does not effect substantial additional condensation. The temperature during addition of this lower alkanoic acid is operably from about 10° C. to about 100° C., preferably from about 20° C. to about 50° C. Substantially all of this lower alkanoic acid added to the composition can be titrated with an alkali metal hydroxide, which suggests that a hydrogen-bonded acid complex is formed and not a salt. Analysis of infrared and proton magnetic resonance spectroscopy supports the theory that the resulting composition is an acid complex, but this structural elucidation is not definitive and the instant composition is not limited thereby.

The subject compositions have shown exceptional activity as conditioners in the froth flotation of coal. Froth flotation of coal is used in the art to beneficiate finely-divided coal. The use of condensates of alkanolamines and fatty acids and salts or other acid derivatives of these condensates as a conditioner in coal flotation is taught by W. C. Meyer, R. D. Hansen and R. E. Hefner, Jr. in application Ser. No. 006,942, now abandoned filed on Jan. 25, 1979 for "Conditioner for Flotation of Coal". W. C. Meyer et al. have filed a continuation-in-part of the aforementioned application, even date herewith, having Ser. No. 109,724. The relevant portions of these two applications filed by W. C. Meyer et al. are incorporated herein by reference to substantiate and further describe the utility of the instant compositions in the flotation of coal.

The coal to be floated can suitably be anthracite, bituminous, subbituminous or the like. The instant composition is preferably employed to float coal which cannot be floated with conventional frothers alone and is particularly effective in the flotation of bituminous coal of intermediate or low rank, where the surface of the coal is oxidized to an extent which significantly impedes the flotation of the coal using conventional agents.

The size of the coal particles to be separated by flotation is important as generally particles larger than about 28 mesh (U.S. Sieve Size) are difficult to float. In typical operations, coal particles larger than 28 mesh, preferably larger than 100 mesh, are separated from both the inert material mined therewith and more finely divided coal by gravimetric separation techniques. However, if a substantial fraction of the coal in the flotation feed comprises particles larger than 28 mesh, it is desirable that the feed be comminuted further prior to flotation.

The sized coal flotation feed optionally is first washed and then mixed with sufficient water to prepare an aqueous slurry having a solids concentration which promotes rapid flotation. Generally, a solids concentration between about 2 to about 20 weight percent solids, more preferably from about 5 to about 10 weight percent, is preferred. The aqueous coal slurry is advantageously conditioned with the instant composition, a frother, fuel oil and other adjuvants, such as activators, dispersing reagents, depressing reagents and conditioning reagents, by mixing with the slurry in a manner known to the art. Generally for difficult to float coal, it is advantageous to contact with mixing the coal slurry with the conditioner and fuel oil for a period of time prior to flotation, so as to effect intimate contact of the conditioner and fuel oil with substantially all of the coal. Where the aqueous coal slurry is prepared in a container distinct from the flotation cell and then is conveyed to the flotation through conduits, the desired intimate contact can conveniently be attained by introducing the conditioner and fuel oil to the slurry upstream from the flotation cell. The frother, however, should be introduced to the slurry shortly before or during flotation to provide maximum frothing.

The loading of the instant novel composition in the flotation medium which effects the greatest recovery of combustible carbonaceous matter with a tolerable amount of inert matter is affected by the size, rank, degree of oxidation and inert matter content of the coal feed, as well as the loading of frother and other adjuvants. Generally, where the novel composition is employed with only fuel oil, the condensate is advantageously employed in a ratio of from about 0.001 to about 1.0, preferably about 0.002 to about 0.2 kilograms of condensate per metric ton of coal flotation feed.

Fuel oil is employed in the flotation medium as a collector. Representative fuel oils include diesel oil, kerosene, Bunker C fuel oil, mixtures thereof and the like. The fuel oil can generally be advantageously employed in a ratio of from about 0.02 to about 2.5 kilograms fuel oil per metric ton of coal flotation feed. The optimal loading of fuel oil in the flotation medium is influenced by numerous factors, such as the size, degree of oxidation and rank of the coal to be floated and the loading of condensate and frother. Therefore, the loading of the fuel oil should be optimized empirically to effect the greatest selectivity and recovery during flotation. In one preferred embodiment, the $C_1$–$C_4$ alkanoic acid derivative of the diethanolamine/fatty acid condensate is charged to the flotation medium dispersed in fuel oil. Preferably, the alkanoic acid derivative comprises greater than about 0.1, more preferably 0.25 and less than about 70, more preferably 50 volume percent of the total fuel oil dispersion. This fuel oil dispersion is believed to be a novel composition. Likewise, a composition of the alkanoic acid derivative and frothing agent and optionally further comprising fuel oil is believed novel.

A frothing agent should be present in the flotation medium to promote formation of a froth. Conventional frothers, such as pine oil, cresol, $C_4$ to $C_8$ alkanols containing one or two tertiary or one quaternary carbon atom, e.g., isomers of amyl alcohol, are suitable for this purpose. However, methyl isobutyl carbinol and polypropylene glycol alkyl or phenyl ethers are preferred as frothers, with polypropylene glycol methyl ethers having a weight average molecular weight between about 200 and about 600 being most preferred. The optimal loading of frother in the flotation medium is influenced by a number of factors, most important of which is the rank and degree of oxidation of the coal. Generally, a ratio of from about 0.05 to about 0.5 kilogram frother per metric ton of coal feed is advantageous.

The coal is operably floated at the natural pH of the coal in the aqueous slurry, which can vary from about 3.4 to about 9.5 depending upon the composition of the feed. However, a pH adjusting composition is optionally used as necessary to adjust and maintain the pH of the aqueous coal slurry prior to and during flotation to a value from about 4 to about 9, preferably about 6 to about 8, which generally promotes the greatest coal recovery. If the coal is acidic in character, the pH adjusting composition can operably be an alkaline material, such as soda ash, lime, ammonia, potassium hydroxide or magnesium hydroxide, with sodium hydroxide being preferred. If the aqueous coal slurry is alkaline in character, a carboxylic acid, such as acetic acid and the like, or a mineral acid, such as sulfuric acid, hydrochloric acid and the like, and operable to adjust the pH.

The conditioned and pH-adjusted aqueous coal slurry is aerated in a conventional flotation machine or bank of rougher cells to float the coal. Any suitable rougher flotation unit can be employed.

The practice of the process employing the instant invention can be used alone to beneficiate coal. Alternatively, the process can be used in conjunction with secondary flotations following the presently described process to effect even greater beneficiation of the coal.

The following example and experiments are illustrative embodiments of the instant composition and its utility. Unless otherwise indicated, all parts and percentages are by weight.

EXAMPLE 1

A 1000-gallon, steam-heated Pfaudler reaction vessel was charged with 2851 kilograms (9876 moles) of a tall oil fatty acid reactant sold by Emery Industries, Inc. under the tradename Emtall 729. This tall oil fatty acid contained 39 percent rosin acids, 29.3 percent oleic acid, 23 percent linoleic acid, 3.7 percent conjugated linoleic acid, 1.8 percent stearic acid and about 5 percent other acids and components. To the reaction vessel were added 519 kilograms (4938 moles) of diethanolamine with stirring. This reaction mixture was sparged with nitrogen and heated to a temperature of about 137° C., at which time water began to evolve. The heating of the mixture was continued unitl the evolution of water ceased. A maximum reaction temperature of 158° C. was reached.

A small sample of the resulting condensation product was analyzed by infrared and proton magnetic resonance spectroscopy. This condensate was determined to contain predominantly an amide ester with lesser amounts of amide and amide diester.

The condensate was cooled in the reaction vessel to a temperature of 43° C. and then 221 kilograms (3679 moles) of acetic acid were introduced with stirring. Analysis of a sample of the resultant product by proton magnetic resonance spectroscopy indicated the presence of the acidic proton in acetic acid, which suggests that a salt is not formed. The acetic acid in the product was titrated stoichiometrically with 0.085 normal KOH, which confirms that an acetic acid salt is not formed.

EXPERIMENTS TO SHOW UTILITY OF COMPOSITION

Experiment 1

Five flotation runs are performed in the laboratory using a #1 diesel oil dispersion of 1:2 condensate of diethanolamine/tall oil fatty acid (DEA/TOFA) or an acetic acid or propionic acid derivative thereof (an 8 volume percent dispersion in the diesel oil) as the combined conditioner and collector. These derivatives consist of 0.5 mole of acetic or propoinic acid for each mole of the condensate. In each run, 200 grams of coal containing 14.4 percent ash in 3 liters of water is introduced into a flotation machine and conditioned for 7 minutes. The pH of the slurry is adjusted to the values tabulated in Table V with a 1 normal aqueous solution of NaOH or HCl.

The slurry is agitated while #1 diesel oil containing the conditioner is charged to the slurry to effect a loading equivalent to about 1.5 kilograms of diesel oil per ton of coal feed and 0.12 kilograms of the condensate per ton of coal. A small amount (0.04 cc) of a conventional frother is added to the slurry, the slurry agitated for 10 seconds and then air is introduced. The results and identifying parameters for each run are tabulated in Table I.

TABLE I

| Run | Conditioner | pH | % Coal Recovery | % Ash Content |
|---|---|---|---|---|
| A | DEA/TOFA* | 5.1 | 88.0 | 9.8 |
| B | Acetic Acid Derivative of DEA/TOFA | 5.0 | 88.0 | 10.2 |
| C | Propionic Acid Derivative of DEA/TOFA | 5.0 | 87.9 | 9.7 |
| D | DEA/TOFA* | 8.0 | 79.3 | 9.3 |
| E | Acetic Acid Derivative of DEA/TOFA | 8.0 | 80.7 | 9.3 |

*Not a composition of this invention.

Experiment 2

A 1:2 condensate of DEA/TOFA and an acetic acid derivative thereof is employed in a coal flotation plant. The acetic acid derivative consists of 0.5 mole of acetic acid for each mole of condensate. The conditioner is added to #1 diesel oil in a quantity sufficient to effect an increase of 10 percent in volume. The mixture of conditioner and #1 diesel oil is introduced at a rate of 200 cubic centimeters per minute to the tank used to collect the smaller than 100 mesh coal prior to introduction to the four banks of Daniel flotation cells. In one instance, diesel oil alone is introduced for purposes of comparison. The pH of the coal slurry in the collecting tank is determined for each run. To each bank of cells at the air port of the first of the four cells in the bank, is introduced 67 cubic centimeters per minute of a polypropylene glycol methyl ether frother having a weight average molecular weight of about 400. For each run, a sample of the coal feed is recovered as it is introduced to the first cell of a bank of cells. Samples of the material recovered by froth flotation are taken from near the end of the second cell in each bank of four cells. Tail materials are sampled at the overflow weir above the sand gate.

The samples of coal feed, floated material and tail material in each instance are dried and then weighed.

One-gram samples of the coal feed, the floated material (or concentrate) and the tail material are then each burned and the weight of the unburned ash determined. The difference in the weight of each of the fractions before and after combustion is assumed to be the weight of coal present in each fraction. The percentage of the ash-free or "clean" coal recovered is then calculated by the formula:

$$\text{Percent Clean Coal} = 100 \times C(F-T)/F(C-T)$$

where:

C = 100 − (Percent Ash in Concentrate)
F = 100 − (Percent Ash in Feed Material)
T = 100 − (Percent Ash in Tail Material)

The results and identifying parameters are tabulated in Table II.

TABLE II

| Run | Conditioner | pH | % Ash in Feed | % Ash in Concentrate | % Clean Coal Recovered |
|---|---|---|---|---|---|
| A | Acetic Acid Derivative of DEA/TOFA | 6.9 | 47.8 | 13.8 | 38.0 |
| B | DEA/TOFA* | 6.8 | 50.1 | 13.8 | 21.1 |
| C | None* | 6.7 | 42.7 | 11.5 | 10.6 |

*Not a composition of this invention.

The data compiled in Table II indicates that the claimed acetic acid derivative of the DEA/TOFA condensate is much more effective in floating certain coals in a commercial floating operation than diesel oil alone or diesel oil containing the DEA/TOFA condensate but not acetic acid.

Although in the foregoing Experiments the invention compostion and diesel oil collector are added upstream and the frother is added at the cells, it is also possible and generally preferred to add the three components at the cell feed box to simplify operations.

What is claimed is:

1. A composition of matter comprising the reaction product of two components:

(1) a condensation product of diethanolamine and a $C_{10}$-$C_{24}$ fatty acid condensed in a mole ratio of about 1:2, and (2) about one-half the equimolar amount of a $C_1$-$C_4$ mono-carboxylic acid or mixture thereof, based on the moles of condensate.

2. The compostion as described in claim 1 wherein the fatty acid is a tall oil fatty acid or a mixture of tall oil fatty acids.

3. The composition as described in claim 1 wherein component (2) is acetic acid.

4. The composition as described in claim 1 wherein component (2) is propionic acid.

5. The composition as described in claim 3 wherein the fatty acid condensed in component (1) is a tall oil fatty acid mixture.

6. The composition of claim 1 which further comprises fuel oil in such an amount that said reaction product constitutes about 0.1 to about 70 volume percent of the total volume.

7. The composition of claim 6 which further comprises an effective amount of a frothing agent.

8. The composition of claim 1 which further comprises an effective amount of a frothing agent.

* * * * *

UNITED STATES PATENT AND TRADEMARK OFFICE

CERTIFICATE OF CORRECTION

PATENT NO. : 4,330,339

DATED : May 18, 1982

INVENTOR(S) : Kenneth H. Nimerick

It is certified that error appears in the above—identified patent and that said Letters Patent is hereby corrected as shown below:

Col. 1, line 18, delete "salts" and insert --salt--.

Col. 4, line 20, after "like," delete the word "and", and substitute the word --are--.

Col. 4, line 50, delete "unitl" and insert --until--.

Col. 5, line 10, after "These" insert --acid--.

Col. 5, line 11, delete "propoinic" and insert --propionic--.

Col. 6, Claim 6, after "1" insert --or 5--.

Signed and Sealed this

*Fifth* Day of *October 1982*

[SEAL]

*Attest:*

GERALD J. MOSSINGHOFF

*Attesting Officer* *Commissioner of Patents and Trademarks*